US007987628B2

(12) United States Patent  (10) Patent No.: US 7,987,628 B2
Le Laidier et al. (45) Date of Patent: Aug. 2, 2011

(54) ANIMAL TRAP

(75) Inventors: Gabriel Le Laidier, St. Gallen (CH); Dennis Walstad, Elburn, IL (US); Silvin Jancic, Villmergen (CH)

(73) Assignee: Swissinno Solutions AG, St. Gallen (CH)

( * ) Notice: Subject to any disclaimer, the term of this patent is extended or adjusted under 35 U.S.C. 154(b) by 172 days.

(21) Appl. No.: 12/065,302

(22) PCT Filed: Sep. 2, 2005

(86) PCT No.: PCT/EP2005/054338
§ 371 (c)(1),
(2), (4) Date: Feb. 29, 2008

(87) PCT Pub. No.: WO2007/028416
PCT Pub. Date: Mar. 15, 2007

(65) Prior Publication Data
US 2008/0216386 A1    Sep. 11, 2008

(51) Int. Cl.
*A01M 23/18* (2006.01)
(52) U.S. Cl. .............................. 43/61; 43/60
(58) Field of Classification Search ........... 43/58, 60–63
See application file for complete search history.

(56) References Cited

U.S. PATENT DOCUMENTS

| 96,744 | A | * | 11/1869 | Tusten | 43/61 |
|---|---|---|---|---|---|
| 1,001,639 | A | * | 8/1911 | Halinka | 43/61 |
| 1,020,448 | A | * | 3/1912 | Recko | 43/61 |
| 1,130,667 | A | * | 3/1915 | Carlson | 43/61 |
| 1,158,185 | A | * | 10/1915 | Danielson | 43/61 |
| 1,213,248 | A | * | 1/1917 | Phillips | 43/62 |
| 1,294,293 | A | * | 2/1919 | Margo | 43/61 |
| 1,380,785 | A | * | 6/1921 | Dybowski | 43/61 |
| 1,444,934 | A | * | 2/1923 | Miller | 43/61 |
| 1,454,998 | A | * | 5/1923 | Haege | 43/61 |
| 1,459,027 | A | * | 6/1923 | Krol | 43/61 |
| 1,466,602 | A | * | 8/1923 | Savicks | 43/61 |
| 1,474,096 | A | * | 11/1923 | Sorensen | 43/61 |
| 1,491,188 | A | * | 4/1924 | Berenyi | 43/61 |
| 1,587,536 | A | * | 6/1926 | Lobit | 43/61 |
| 1,607,563 | A | * | 11/1926 | Prokop | 43/61 |
| 1,633,857 | A | * | 6/1927 | Gonzalez | 43/62 |
| 1,648,160 | A | * | 11/1927 | Boedecker | 43/62 |
| 1,648,765 | A | * | 11/1927 | Griffin | 43/61 |
| 1,703,990 | A | * | 3/1929 | Daniels | 43/61 |
| 1,734,855 | A | * | 11/1929 | Hendricks | 43/61 |
| 1,918,266 | A | * | 7/1933 | Henry | 43/61 |
| 2,023,427 | A | * | 12/1935 | Laughlin | 43/61 |
| 2,059,238 | A | * | 11/1936 | Howland | 43/61 |

(Continued)

FOREIGN PATENT DOCUMENTS
DE     202004016935     3/2005
(Continued)

*Primary Examiner* — Darren W Ark
(74) *Attorney, Agent, or Firm* — Shoemaker and Mattare

(57) ABSTRACT

An animal trap for catching mice has a box-shaped housing with foundation housing and attached to it is the cover housing, capable of swiveling. Arranged in the interior of the housing, there is a triggering system designed like a seesaw with a stepping platform. The cover housing is locked in the open position with the help of mechanical restraint devices. A locking mechanism resting in the cover housing has an unlocking button for restoring the open position, as well as an operating button for the user to transfer the cover housing into closed position.

14 Claims, 3 Drawing Sheets

U.S. PATENT DOCUMENTS

Figure 1:
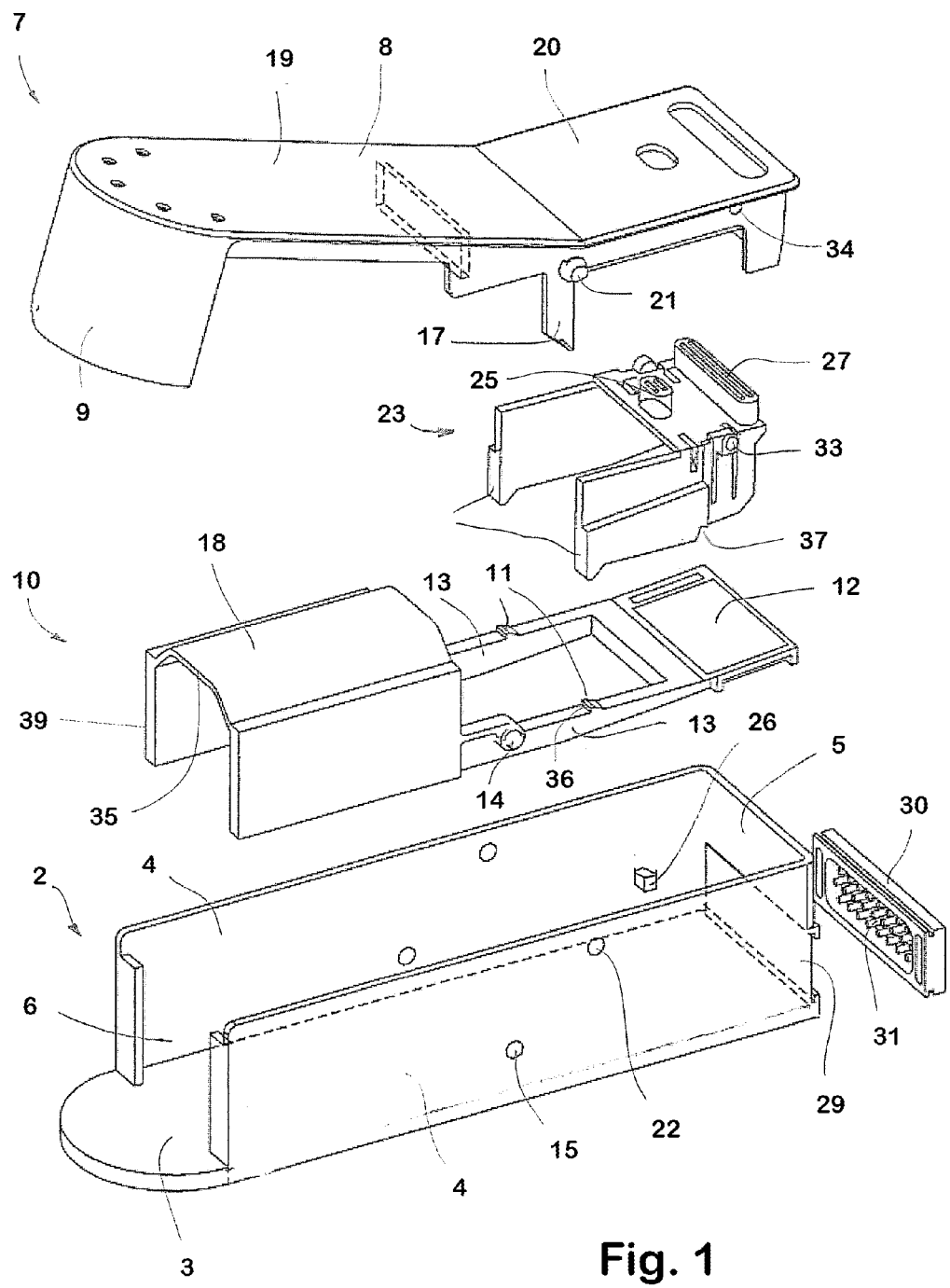

| | | | | |
|---|---|---|---|---|
| 2,068,492 A * | 1/1937 | Johnson | | 43/83 |
| 2,155,006 A * | 4/1939 | Cooper | | 43/61 |
| 2,161,789 A * | 6/1939 | Wingfield | | 43/61 |
| 2,342,444 A * | 2/1944 | Alday | | 43/61 |
| 2,412,518 A * | 12/1946 | Krelwitz | | 43/61 |
| 2,446,168 A * | 8/1948 | Bricker | | 43/61 |
| 2,587,349 A * | 2/1952 | Mace | | 43/67 |
| 2,724,209 A * | 11/1955 | Cain | | 43/83.5 |
| 2,774,175 A * | 12/1956 | Maddocks | | 43/61 |
| 2,793,464 A * | 5/1957 | Bird | | 43/61 |
| 2,803,918 A * | 8/1957 | Hall | | 43/61 |
| 4,127,958 A * | 12/1978 | Peters et al. | | 43/81 |
| 4,379,374 A * | 4/1983 | Lindley | | 43/61 |
| 4,550,523 A * | 11/1985 | Spiller | | 43/61 |
| 4,569,149 A * | 2/1986 | Sensing et al. | | 43/61 |
| 4,578,892 A * | 4/1986 | Melton | | 43/61 |
| 4,665,644 A * | 5/1987 | Vajs et al. | | 43/82 |
| 4,803,799 A * | 2/1989 | Vajs et al. | | 43/82 |
| 5,123,200 A * | 6/1992 | Vance | | 43/61 |
| 5,337,512 A * | 8/1994 | Krenzler | | 43/82 |
| 5,386,663 A | 2/1995 | Fields | | |
| 5,502,918 A * | 4/1996 | Oviatt | | 43/61 |
| 5,706,601 A | 1/1998 | Dail | | |
| 5,720,125 A * | 2/1998 | Oviatt | | 43/61 |
| 5,953,853 A * | 9/1999 | Kim | | 43/61 |
| 6,029,393 A * | 2/2000 | Stewart | | 43/63 |
| 6,202,340 B1 * | 3/2001 | Nieves | | 43/61 |
| 6,508,031 B1 * | 1/2003 | Johnson et al. | | 43/88 |
| 6,539,663 B2 * | 4/2003 | Mosher | | 43/61 |
| 6,564,501 B1 * | 5/2003 | Schislyonok | | 43/61 |
| 6,574,912 B1 * | 6/2003 | Johnson | | 43/58 |
| 7,540,109 B2 * | 6/2009 | Hall | | 43/61 |
| 7,596,902 B2 * | 10/2009 | Han et al. | | 43/61 |
| 2002/0011019 A1 | 1/2002 | Stoico et al. | | |
| 2008/0282600 A1 * | 11/2008 | Rich et al. | | 43/61 |

FOREIGN PATENT DOCUMENTS

| | | | |
|---|---|---|---|
| GB | 1382822 | | 2/1975 |
| GB | 2095087 A | * | 9/1982 |
| GB | 2384681 | | 8/2003 |
| GB | 2393628 A | * | 4/2004 |
| JP | 2503055 | | 9/1990 |
| JP | 2002-233291 | | 8/2002 |
| JP | 2003284479 A | * | 10/2003 |
| JP | 2005204628 A | * | 8/2005 |

* cited by examiner

ANIMAL TRAP

The invention relates to an animal trap according to the generic term of claim 1. This type of animal trap is used for live trapping of rodents, amongst other things, and mice and other small animals in particular.

There are already numerous mouse traps that are well-known and in use. Comparable mouse traps of the same type are described for example in DE 20 2004 016 935 U1. This mouse trap consists essentially of two box-shaped housings, whereby they are connected centrically with the ability to swivel. At the same time, the lower part of the housing protrudes upwards and is open at one end. The rear end of the upper part of the housing has a reservoir for bait created by bends. When a mouse takes the bait from the reservoir, the trap will close in a swiveling motion, due to the imbalance of the upper part of the housing (the principle of gravity). Since the mouse trap is only held in open position by the placement of bait, disadvantages arise in the handling of the trap. It has been further revealed in practice that unintentional triggering can occur, for example, when animals climb on the top side of the housing.

It is therefore the aim of the above-mentioned invention to avoid the known disadvantages, especially in creating the type of animal trap mentioned above, which does not allow unintentional triggering by animals. Furthermore, the animal trap should feature simple handling. Then, it should be able to be manufactured in a simple way. These tasks are solved per the invention with an animal trap that comprises the features in claim 1.

The foundation housing can consist of a floor section, two side walls, and an opening on the opposite end of the back wall. The cover housing is preferably attached to the foundation housing in a manner that allows for swiveling, whereby the swivel axel runs perpendicular to the side walls of the foundation housing. Unintentional triggering by animals that climb onto the roof section of the housing can be prevented by the use of a barrier with mechanical means of restraint. Of course the animal trap can be equipped in such a way though that the user can bring it to closed position on his own. With the system of a mechanical triggering device on the inside of the housing, the desired triggering process can be determined with precision. In particular, contact-sensitive triggering systems come into question as well, but other solutions would also be plausible.

In the initial design, the cover housing can swivel under its own weight into closed position by a swinging motion, when the lock is removed. Additionally, in open position, the cover housing can rest in the foundation housing in such a way that after triggering, the influence of gravity transfers it into closed position. For example, cover housing can rest eccentrically in the foundation housing. An advantage of the principle of gravity is that the production and use of the animal trap is simple.

Additionally or alternatively, the swiveling part can be held in open position using spring tension. The animal trap can be closed in a favorable way through the use of spring tension. Consequently, possible escape of an animal from the inside of the housing during the closing process can be prevented through increased closing force.

The triggering system can contain a stepping platform or impact platform to trigger the swiveling motion. The stepping platform or impact platform would preferably have to be positioned in the area of the back wall. By having an animal step onto the stepping platform, the triggering process can be reliably initiated, and the number of catches substantially increased. A further advantage of this design is that the bait is merely used as bait and can be utilized independently from the triggering system.

It may be preferable if the triggering system has a stepping platform, on which two parallel arms stretch along the side walls, capable of swiveling in the foundation housing. The animal trap can be readily triggered by lighter weights through a lever constructed in this manner.

It can be especially advantageous if the triggering system rests in the foundation housing like a seesaw. The seesaw can have parallel arms that stretch along the side of the walls, on which a stepping platform is arranged on one end and an insertion section on the opposite end. This insertion section can be an open U-shaped section against the floor portion where animals can enter. For example, the insertion section can have the profile shape of a U, with two side sections and a connecting horizontal plate, through which the animal trap can be triggered by the entry of a larger animal bumping against the connecting horizontal plate.

Joints can be arranged laterally on the arms of the triggering system that mesh with corresponding joint basins in the side walls of the foundation housing. Preferably, these joint basins are formed, in particular, by circular openings or drillings.

It is advantageous if the restraint device is formed by the counter bearing on the arms of the triggering system that support respective cover housing inhibitors in open position. A counter bearing can be for example a tooth-saw like projection with a locking flank directed towards the top as a means of support for the inhibitor. In this process, the counter bearing can be formed on one of the surfaces of the arms that are turned towards the top side.

The roof section can exhibit a front cover surface and a rear cover surface bent in such a manner around the angle of inclination in relation to the front cover surface that the front cover surface in closed position and the rear cover surface in open position run just about parallel to the floor section. Thus the angle of traverse would correspond to the angle of inclination. Such a system is characterized by good manageability and ergonomic form.

Joint cams can each be laterally arranged on the cover housing that meshes with corresponding joint basins that in particular, have been formed in the side walls by openings.

A locking mechanism with at least one pawl can be arranged on the roof section of the cover housing, which can be engaged in closed position by a corresponding counter bearing on the housing. Counter bearings can for example be cam ledges arranged on side walls. A locking mechanism can simply prevent the opening of the animal trap by a captured animal.

It can be advantageous for a user if there is an unlocking button on the locking device for restoring the cover housing to the open position. With this, the animal trap could be used in a simple way.

In a further design the locking device can be separately placed on the cover housing, preferably a one-pieced component with a pawl and an unlocking button to restore the open position. The locking mechanism can be affected in such a way as to be made swiveling, for example through pressure on the unlocking button that the pawl from the counter bearing can be released. A cost effective and efficient production of the locking mechanism can be realized with a system of this kind.

AS a particularly favorable design, a locking mechanism can work together with the triggering system in such a way that by pressing an operating button, the cover housing is transferred into closed position. Consequently, a user can close an open trap again, as needed. Especially preferred in this process is the necessary pressure, more than that of the body weight of the animal.

A captured animal can easily be released again by the unlocking button that is preferably positioned in the area of the back wall of the roof section. In particular, the risk of injury for the user can be considerably reduced, because the animal cannot come in contact with the user during release.

The pawl of the locking mechanism can be arranged in such a way that the triggering procedure can be initiated by pressing the operating button. In addition, it can form a stop for the triggering system particularly in the area of the stepping platform. In this manner, a user can put the cover housing into closed position with great ease.

Foundation housing, cover housing, triggering system, and preferably the locking mechanism as well can all be made of synthetic material that can be put together using snap connections. This system has the advantage of being simple to produce and is cost effective. In addition, metal parts can be totally avoided.

An opening can be planned in the back wall of the foundation housing, in which a sliding element with a receptacle for bait can be inserted. For example, the sliding element could be slid laterally in the opening via a groove guideway design. Of course, the sliding element could also be fastened to the back wall in a different way, for example by snapping open the end wall.

Figure 2:
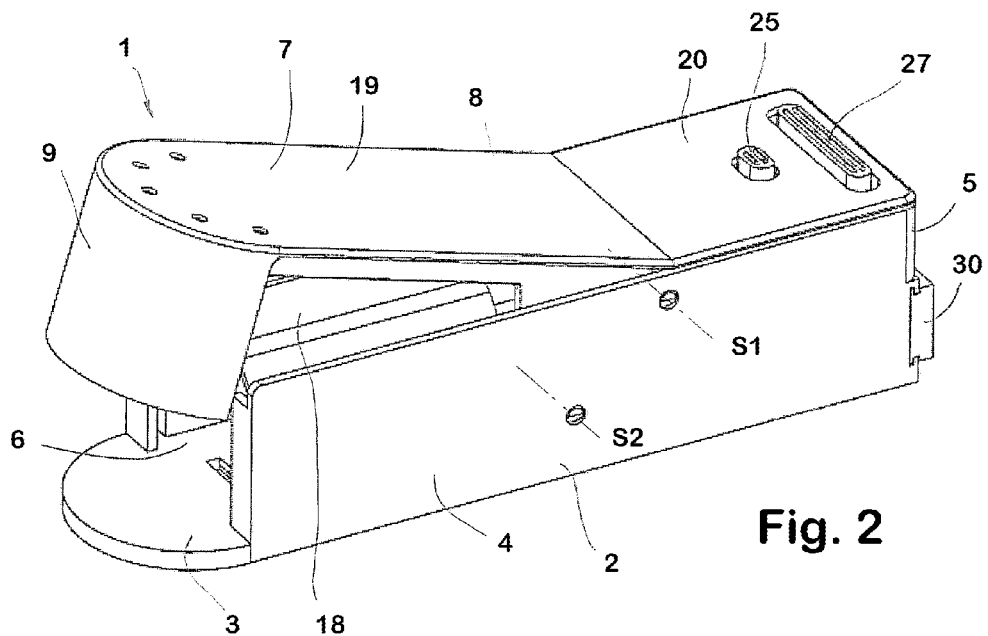
Figure 3:
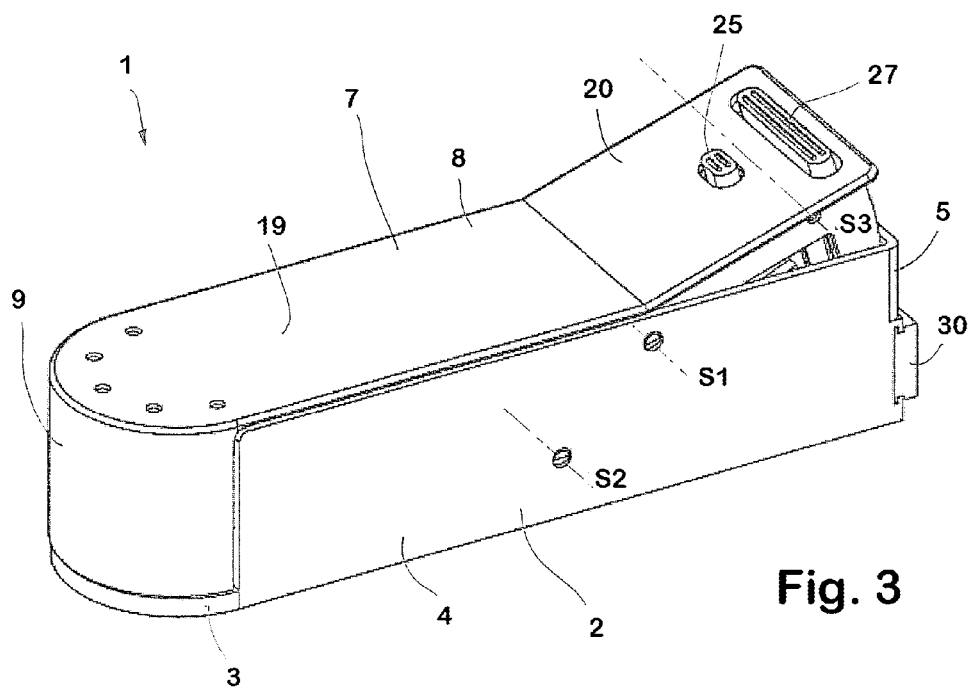
Figure 4:
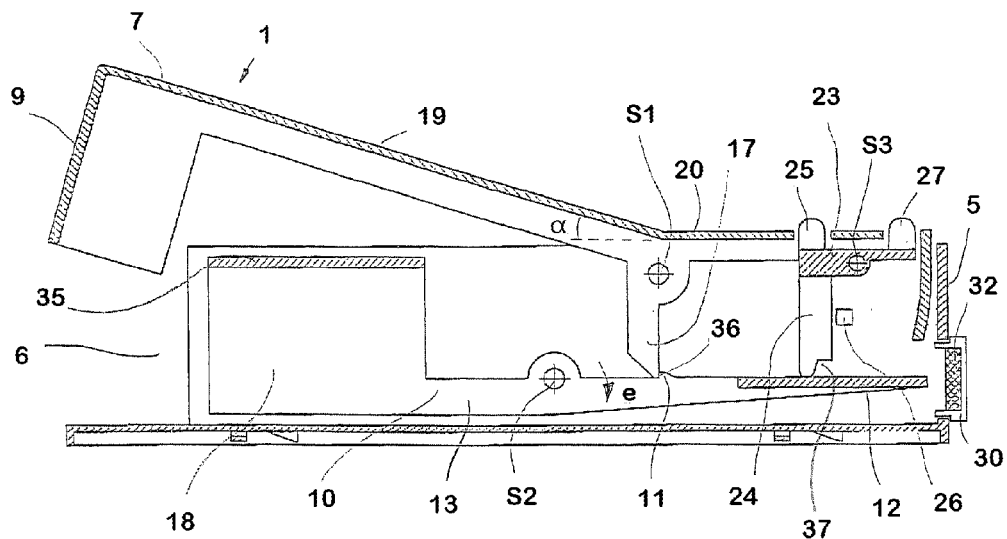
Figure 5:
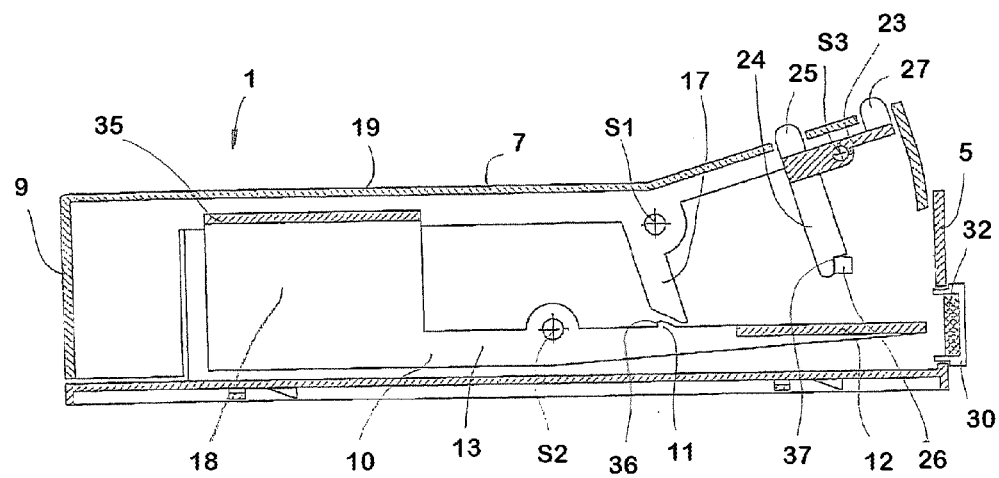

Further individual features and advantages of the invention are made evident in the following description of the model design and the diagrams. Being shown is:

FIG. 1 a perspective exploding diagram of an animal trap according to invention, FIG. 2 a perspective representation of the animal trap per FIG. 1 in open position, FIG. 3 a perspective representation of the animal trap per FIG. 1 in closed position, FIG. 4 a cross-section through a somewhat modified animal trap in open position, and FIG. 5 a cross-section through the animal trap per FIG. 4 in closed position.

As FIG. 1 shows, an animal trap per invention consists of relatively few components. The essential components are: foundation housing 2, cover housing 7, triggering system 10, as well as a locking mechanism 23. These components are preferably made of synthetic material, and can be easily manufactured by an injection molding procedure. For assembly of components, joint cams 14, 21, 33 and in addition corresponding joint basins are intended in form of gaps 15, 22, and 34. This fastening system allows for assembly by simply snapping together.

As is further evident from FIG. 1, foundation housing 2 is designed to be open on the top side. It has two side walls 4, a back wall 5, and an entrance opening on the opposite side of the back wall 6. An opening 29 is designed in the back wall 5, into which the sliding element 30 can be slid from the side via a groove guideway design. This sliding element has a receptacle 31 for bait. Various vegetable or animal substances can be applied as bait, depending on intended use.

There are circular openings in the side walls 4. The triggering system 10 and cover housing 7 are fastened by joint cam 14 in opening 15, and joint cam 21 in opening 22 so that they are able to swivel. The locking device 23 is fastened, able to swivel, by joint cam 33 in corresponding opening 34 in cover housing 7. Of course, a fastening system could be conceivable with the help of separate axle parts.

The cover housing consists of essentially a roof section 8, and on its front end, a perpendicular running end wall section 9. The end wall section 9 closes up the entrance opening 6 in closed position. The roof section 8 consists of a front cover section 19 and a rear cover section 20. There are openings in the area of the rear cover section intended for the incorporation of an operating button 25 and an unlocking button 27. Furthermore, a locking segment 17 protrudes from the roof section 8 in the direction of the floor section 3.

The triggering system 10 is arranged as a seesaw with two arms 13, whereby on one end of the arms a stepping platform 12 is arranged, and on the other end, an open insertion section 18 is designed on the floor section 3. The insertion section 18 can have the profile shape of a U, with two side sections 39 and a connecting horizontal plate 35. The swivel axle (S2) of the seesaw is defined by joint cam 14. The animal trap is fundamentally triggered by stepping onto the stepping platform. However, it is also conceivable that the triggering procedure is initiated by bumping into the horizontal plate 35 of the U-shaped insertion section 18, for example, by an (attempted) entry of too large an animal.

Counter bearings 11 for the cover housing's 7 locking segments 17 appear on the arms 13. Per the design of the model on hand, the locking mechanism is also developed as a one-piece component. The locking mechanism 23 has pawls 24 with their respective break sections 37 that mesh in closed position onto the counter bearing 26 that is attached to the interior of the side walls 4. The exact operation of the animal trap, particularly, the function of the triggering system 10 and the locking mechanism 23 is to be explained in detail with the following FIGS. 4 and 5.

FIGS. 2 and 3 show exterior views of the animal trap depicted in FIG. 1. Obviously, the animal trap 1 allows an animal to enter the opening 6 while in open position as per FIG. 2. In this position, the rear cover surface 20 of the roof section 8 runs parallel to the floor section 3 of the housing. The cover housing 7 rests in the foundation housing 2 by the swivel axle indicated by S1 (further swivel axles are indicated by S2 and S3; compare with FIG. 4/5). The animal trap 1 can be closed by a triggering procedure. FIG. 3 shows the animal trap 1 in closed position. Obviously, the front cover surface 19 runs parallel to the floor section 3 in this position.

As is evident from FIG. 4, the cover housing 7 is locked into position by the locking segment 17 through the restraining device 11. The restraining device 11 is formed by a tooth-saw projection on the arm 13 that has a locking flank 36 that connects with the locking segment 17 and a beveled flank. Through seesaw motion in direction indicated by "e", the locking segment 17 can be released from the restraining device 11, whereby the cover housing is transferred into closed position by a kind of pendulum motion under the influence of gravity. To make it possible for the user to close the animal trap easily, the locking mechanism's 23 operating button 25 is provided, fitted to FIG. 1. As FIG. 4 shows, the pawl 24 forms a stopper for the stepping platform 12. Therefore, the triggering system can also be brought into the necessary seesaw motion required for triggering, by pressing the operating button 25 over the locking segment 24. In this process, the animal trap 1 is equipped in such a way that a certain amount of pressure is necessary, in order to bring about the triggering procedure. This way, the closing procedure can be prevented from triggering by the actions of an animal on the operating button 25.

FIG. 5 shows that in closed position, cover housing 7 is secured by the locking mechanism 23. The pawl 24 engages the corresponding counter bearing 26 via the break section 37. The unlocking button 27 is intended for releasing the engaged connection. The locking mechanism 23 can be swung around the swivel axle S3 in such a way that the pawl 24 can be released from the counter bearing 26 by pressing on the unlocking button.

The invention claimed is:

1. A trap for catching mice or other small animals, said trap comprising:
   a foundation housing having an open top and two side walls, with an entrance opening at one end;
   an attached cover housing that swivels between a closed position and an open position, said cover housing having a roof section for covering said open top of the foundation housing and an end wall section for closing off the entrance opening in said closed position;
   a mechanical restraining device for locking the cover housing in said open position;
   a mechanical triggering system that works in conjunction with the cover housing to release a lock inside the housing, when triggered by weight of an animal,
   the trigger system resting in the foundation housing in a seesaw manner, and comprising
   two parallel arms that extend laterally along the side walls of the foundation housing,
   a stepping platform being arranged on one end of the arms, and
   an insertion portion both having an inverted U-shaped cross-section at an opposite end of the arms and being, open towards a floor section of the foundation housing, said insertion portion having two side sections extending vertically upward from the opposite end of the arms to respective top portions of the two side sections and a plate both connecting the to portions of the two side sections to each other and extending above the opposite end of the arms, whereby animals can enter the trap through the inverted U-shaped insertion portion.

2. A trap according to claim 1, wherein the cover housing rests in the open position in the foundation housing in such a way that after triggering, it is transferred into the closed position by force of gravity.

3. A trap according to claim 1, further comprising joint cams arranged laterally on the arms of the trigger system that mesh in corresponding joint basins formed by openings in the side walls of the foundation housing.

4. A trap according to claim 1, wherein the restraining device is formed by counter bearings of the triggering system, upon which respective locking segments of the cover housing are supported in the open position.

5. A trap according to claim 1, wherein the roof section has a front cover surface and a rear cover surface bent in such a manner about an angle of inclination that the front cover surface in the closed position of the cover housing and the rear cover surface in the open position of the cover housing run about parallel to the floor section.

6. A trap according to claim 1, wherein joint cams are arranged laterally on the cover housing that mesh with corresponding joint basins formed by openings in the side walls.

7. A trap according to claim 1, further comprising a locking mechanism with at least one pawl arranged on the roof section of the cover housing that can be engaged in the closed position of the cover housing by a corresponding counter bearing on the housing.

8. A trap according to claim 7, wherein the locking mechanism has an unlocking button for restoring the cover housing to the open position.

9. A trap according to claim 8, further comprising:
   the unlocking button and at least one pawl being formed as one piece, wherein the locking mechanism is able to swivel in such a manner that the at least one pawl can be released from the counter bearing through action of the unlocking button.

10. A trap according to claim 9, wherein the locking mechanism operates together with the triggering system in such a way that by pressing on an operating button of the locking mechanism, the cover housing can be transferred into said closed position.

11. A trap according to claim 10, wherein the locking mechanism is formed in such a way that the pressure needed to activate the operating button is more than a net weight of the animal.

12. A trap according to claim 9, wherein the at least one pawl of the locking mechanism forms a latch for the triggering system in an area of a stepping platform by pressure exerted on the operating button.

13. A trap according to claim 9, wherein the foundation housing, the cover housing, the triggering system, and the locking mechanism are made of a synthetic material that can be assembled by snap connections.

14. A trap according to claim 9, further comprising an opening in a back wall of the foundation housing opposite the entrance opening, into which a sliding element with a receptacle for bait can be inserted.

* * * * *